United States Patent
Langford et al.

(10) Patent No.: US 8,294,967 B2
(45) Date of Patent: Oct. 23, 2012

(54) COHERENT PHOTONIC FREQUENCY CONVERSION (CPFC) FOR QUANTUM COMPUTING USING PUMPED FOUR-WAVE MIXING PROCESSES

(75) Inventors: Nathan K. Langford, Vienna (AT); Sven Ramelow, Vienna (AT)

(73) Assignee: University of Vienna, Vienna (AT)

( * ) Notice: Subject to any disclaimer, the term of this patent is extended or adjusted under 35 U.S.C. 154(b) by 468 days.

(21) Appl. No.: 12/568,413

(22) Filed: Sep. 28, 2009

(65) Prior Publication Data
US 2010/0079833 A1    Apr. 1, 2010

Related U.S. Application Data

(60) Provisional application No. 61/101,473, filed on Sep. 30, 2008.

(51) Int. Cl.
*G06E 3/00*    (2006.01)
(52) U.S. Cl. .................................................. 359/107
(58) Field of Classification Search ............. 359/107, 359/108
See application file for complete search history.

(56) References Cited

OTHER PUBLICATIONS

K. Garay-Palmett et al., "Photon pair-state preparation with tailored spectral properties by spontaneous four-wave mixing in photonic-crystal fiber", Optics Express, vol. 15, No. 22, (Oct. 29, 2007), pp. 14870-14886.*

* cited by examiner

*Primary Examiner* — Alessandro Amari
(74) *Attorney, Agent, or Firm* — Birch, Stewart, Kolasch & Birch, LLP

(57) ABSTRACT

A system and method for the controlled generation, manipulation, and conversion of individual photons in and for a quantum computing environment or a quantum communication environment are provided. Systems and methods for doubling a single photon in a first propagation mode into two new photons in one or two new propagation modes, combining two photons in one or two propagation modes into a single photon of a single propagation mode, and implementing a pi phase shift on a two-photon state but not on the one-photon state in a fully controlled, consistent, and repeatable fashion are also provided, as well as a source of individual photons having clearly defined and fully controllable properties. Embodiments of the above allow for generation and conversion operations that are up to 100% efficient. The generation, conversion, combination, and phase shifting operations are preferably carried out inside a non-linear $\chi^3$ material of a predetermined length.

17 Claims, 7 Drawing Sheets

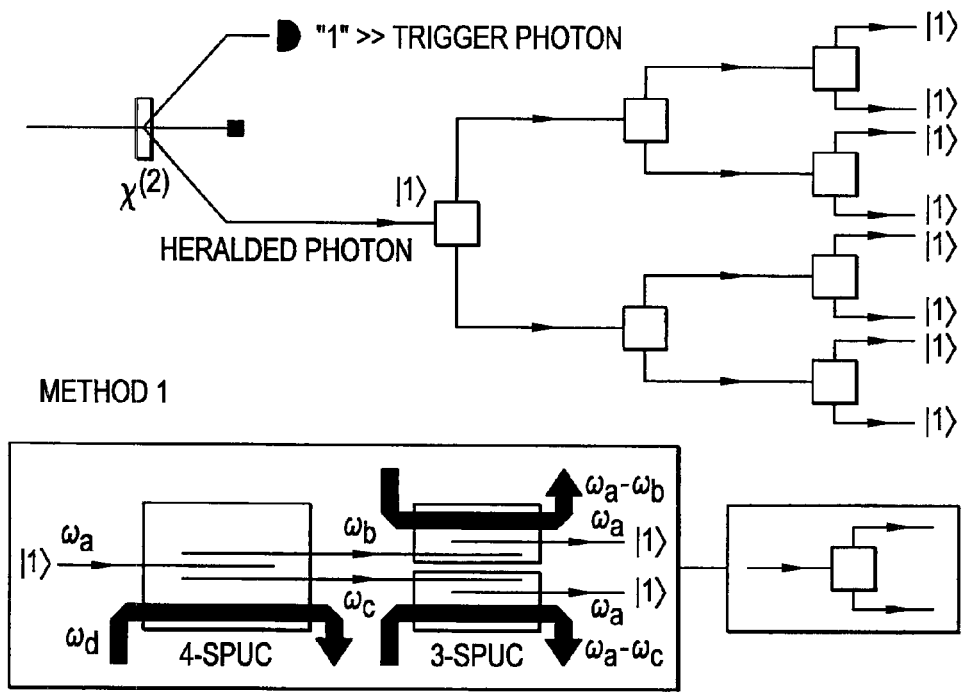

FIG.3A

SCALEABLE CREATION OF MANY, INDISTIGUISHABLE SINGLE PHOTONS FOR QUANTUM COMPUTATION BY CASCADED FWM-PHOTON-DOUBLING

<u>2 FWM-PROCESSES:</u>
IDLER (SINGLE PHOTON) + PUMP1 (STRONG COHERENT) -> 2x SIGNAL (SINGLE PHOTON)
SIGNAL (SINGLE PHOTON) + PUMP2 (STRONG COHERENT) -> 2x IDLER (SINGLE PHOTON)

$s = \frac{1}{2}(i+p1)$
$i = \frac{1}{2}(s+p2)$

<u>PHASEMATCHING AND EFFICIENCY:</u> WITH PCFs OR DSFs

| | | | |
P2  i  s  P1   w

<u>SEPERATING DEGENERATE PHOTONS:</u> INVERSE HOM WITH FIBER LOOPS (|02⟩+|20⟩ -> |11⟩)

<u>CASCADING SCHEME:</u>

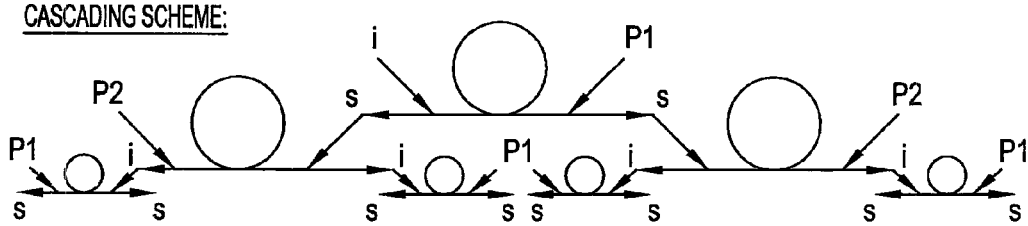

SEPERATING AND COMBINING FIELDS BY TELECOM WDM?

FIG.3B

● STANDARD SINGLE-PHOTON DETECTOR

COHERENT PHOTONIC FREQUENCY CONVERSION (CPFC) FOR QUANTUM COMPUTING USING PUMPED FOUR-WAVE MIXING PROCESSES

This Nonprovisional application claims priority under 35 U.S.C. §119(e) on U.S. Provisional Application No(s). 61/101,473 filed on Sep. 30, 2008, the entire contents of which are hereby incorporated by reference.

TECHNICAL FIELD OF THE INVENTION

The present invention pertains to methods and devices for the controlled generation, manipulation, and conversion of individual photons in and for a quantum computing environment or a quantum communication environment. Specifically, the present invention discusses systems and methods for doubling a single photon in a first propagation mode into two new photons in one or two new propagation modes, combining two photons in one or two propagation modes into a single photon of a single propagation mode, and implementing a pi phase shift on a two-photon state but not on the one-photon state in a fully controlled, consistent, and repeatable fashion. The present invention also pertains to a source of individual photons having clearly defined and fully controllable properties. The present invention allows for generation and conversion operations that are up to 100% efficient (i.e. fully deterministic) but also provides substantial benefits at efficiencies as low as 1% to 10%. The generation, conversion, combination, and phase shifting operations of the present invention are preferably carried out inside a non-linear $\chi^3$ material of a predetermined length.

BACKGROUND

Quantum communication and quantum computation are two of the most important areas within the rapidly expanding and highly competitive field of quantum information science. They have attracted wide interest from physicists in many different subject areas because of their potential both for producing genuine quantum technologies and for providing a context for exploring many fundamental aspects of physics itself, such as entanglement and information capacity.

The pioneering scheme proposed by Knill, Laflamme and Milburn in 2001 made single-photon optics a legitimate candidate for producing a working quantum computer. While it would be brave to say that this scheme provides a practically feasible solution, it did stimulate an active theoretical effort in this direction and led to some of the earliest demonstrations of quantum logic gates. Moreover, since then, several major theoretical advances have provided very promising possibilities for achieving a genuinely scaleable photonic quantum computer.

A reliable source of heralded single photons would be a significant advance towards the goal of effective quantum computing.

SUMMARY OF THE INVENTION

Embodiments of the present invention pertain to a method of generating multi-photon states with up to 100% efficiency in a quantum computing or quantum communication environment with a four-wave mixing process. Embodiments of such a method may include steps of identifying four photon propagation modes inside a non-linear $\chi^3$ material of a predetermined length; providing a target photon in the first propagation mode within the material; pumping the material with an optical beam source in the fourth propagation mode; generating two new single photons from the target photon, the first converted photon having the second propagation mode and the second converted photon having the third propagation mode, where the generation process is up to 100% efficient.

Further embodiments of the above method may include an additional step of providing each of the two new single photons as target photons in the first propagation mode for subsequent iterations of a photon generation process. Yet further embodiments may have a fully deterministic generation process that is 100% efficient, and further embodiments still may employ the same propagation mode for the second and third propagation modes.

Further embodiments of the present invention pertain to a method of combining photons with up to 100% efficiency in a quantum computing or quantum communication environment with a four-wave mixing process. Embodiments of such a method may include steps of: identifying four photon propagation modes inside a non-linear $\chi^3$ material of a predetermined length; providing two target photons within the material, the first target photon having the first propagation mode and the second target photon having the second propagation mode; pumping the material with an optical beam source in the fourth propagation mode; combining the target photons into a new single photon having the third propagation mode, where the combining process is up to 100% efficient.

Further embodiments of the above method may employ a combining process that is fully deterministic and 100% efficient, while other embodiments may employ a combining process that is between 10% and 100% efficient. Further embodiments still may employ the same propagation mode for the second and first propagation modes.

Yet further embodiments of the present invention pertain to a method of controlled photon manipulation in a quantum computing or quantum communication environment with a four-wave mixing process. Embodiments of such a method may include steps of: identifying four photon propagation modes inside a non-linear $\chi^3$ material of a predetermined length; providing two target photons within the material, the first target photon having the first propagation mode and the second target photon having the second propagation mode; pumping the material with an optical beam source in the fourth propagation mode; applying a controlled $\pi$ phase shift to the target photons.

Further embodiments of the above method may employ the same propagation mode for the second and first propagation modes.

Embodiments of the present invention may also pertain to a system for converting any single photon source into a source of photon pairs or a source of n photons, where n is any positive integer greater than 1. Embodiments of such a system may include a non-linear $\chi 3$ material of a predetermined length; an optical beam pump source; an optical single-photon source that provides a target photon; and a photon detection and propagation mode control system. The target photon in such an embodiment is in a first propagation mode in the material. The optical beam source pumps the material in a fourth propagation mode, and the system governs the interaction of the pump source and the photon such that the target photon is converted into two heralded photons, the first heralded photon having a second propagation mode and the second heralded photon having a third propagation mode, where the conversion process is up to 100% efficient.

In some embodiments of the above system, the optical single-photon source may be a spontaneous parametric down-conversion source. In other embodiments, the single-photon source may be one or more quantum dots.

In some embodiments of the above system, the control system may be configured to perform a fully deterministic, 100% efficient conversion process. In yet further embodiments, the system may be configured such that the efficiency of the conversion process is in a range between 10% and 100%

In yet further embodiments of the above system, the second and third propagation modes may be the same.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

SUMMARY OF DRAWINGS

The present invention will become more fully understood from the detailed description given hereinbelow and the accompanying drawings which are given by way of illustration only, and thus are not limitative of the present invention, and wherein:

FIG. 3A depicts an embodiment of a scheme for implementing 100%-efficient cascaded photon doubling;

FIG. 3B depicts another embodiment of a scheme for implementing 100%-efficient cascaded photon doubling;

DETAILED DESCRIPTION

Figure 1A:
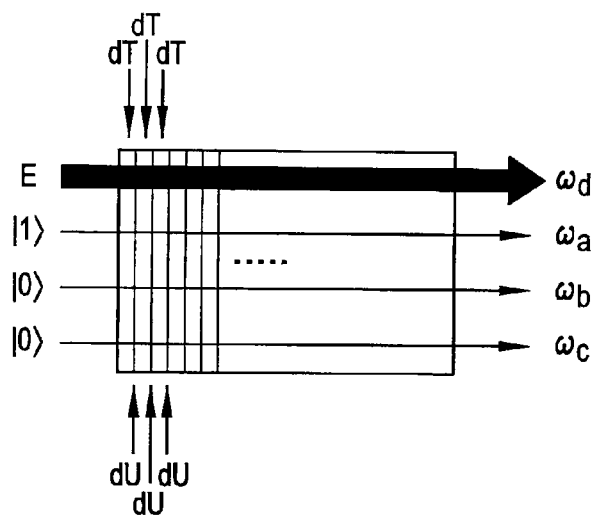
FIG. 1A depicts an embodiment of four-wave mixing in a nonlinear medium divided into infinitesimal slices with propagation and interaction components.

The following detailed description of the invention refers to the accompanying drawings. Also, the following detailed description does not limit the invention. Instead, the scope of the invention is defined by the appended claims and equivalents thereof.

Single photons are arguably the best-understood and most precisely controllable quantum system available within quantum information science and have been used both in the earliest demonstrations of entanglement and also to produce the highest-quality entanglement reported to date. Indeed, the measurement and manipulation of optical polarization was studied in detail long before the advent of modern physics in the early 1900s (e.g., the anticipation of the modern measurement technique of quantum state tomography). Spontaneous parametric down conversion (SPDC) provides the best available source of heralded single photons and has proven particularly fruitful for generating photonic entanglement by taking advantage of the conservation of energy and momentum which results from the phase-matching conditions inside the nonlinear medium (e.g., for polarization,).

To date, there have been relatively few experiments with single photons which have involved actively manipulating the frequency DOF. One of the most promising ways, however, to do this controllably and precisely is to use a threewave $\chi^2$-nonlinear mixing process called single photon up-conversion (SPUC). The key idea is to interact an intense pump beam with a single (target) photon (different wavelengths) inside a nonlinear medium such that the pump beam drives the single photon to cycle coherently between two different frequencies. If, for example, the interaction is turned off half-way through a full cycle, then the single photon at one frequency can be completely converted into the second frequency, and most importantly, this process can in principle be made 100% efficient. Alternatively, if the beams interact for a different time, then even superpositions of single-photon frequency states can be created. Indeed, after a full interaction cycle, the single photon will return to the original frequency, but with a $\pi$ phase shift of geometric origin (a Berry's phase) which can be detected in an interferometer. This can therefore be used to create an all-optical switch for single photons.

The efficient conversion of single photons from one frequency to another is the standard motivation of SPUC. Here, however, we consider a broader scope for the research by exploring how SPUC may be employed as an intrinsic part of quantum information processing tasks. In particular, we explore generalizations of the three-wave mixing process and introduce several novel schemes for using related four-wave mixing processes to implement important quantum computing tasks, including a deterministic entangling gate for two qubits. In fact, we show how these schemes can be used to solve all of the remaining problems with optical quantum computing as illustrated by the DiVincenzo Criteria for quantum computing.

The DiVincenzo criteria describe the necessary conditions for a viable implementation of quantum computation; roughly speaking, it needs a good source of stable, well-behaved qubits, reliable single- and multi-qubit operations, and measurements. In the Quantum Information Science and Technology Roadmap on Quantum Computation, they are used in conjunction with two complementary criteria which are necessary conditions for quantum computer networkability; it needs a reliable interface between stationary and flying qubits and the ability to faithfully transmit flying qubits.

Using single photons with polarization-encoded qubits is one of the most well-developed and promising implementations of quantum computing. The information exhibits extremely long decoherence times under most conditions, and high-precision polarization optics such as wave plates and polarizing beam displacers are readily available which make arbitrary control of single-qubit rotations and measurement projections almost trivial. Moreover, single photons are widely accepted to be the only currently viable solution for transmitting quantum information around a network. The main remaining challenges for optical quantum computing are: to find good on-demand single photon sources; to be able to induce reliable interactions between multiple qubits; to build high-efficiency single-photon detectors at the required optical wavelength; and to build a reliable quantum memory for the stored information. As discussed above, SPUC based on three-wave mixing in $\chi^{(2)}$-type nonlinear media offers a possible solution for the latter two problems by providing a potential means to convert the photons to whatever wavelength is most convenient for either detection or coupling to a stationary quantum system (a memory qubit). We now describe how a similar process based on four-wave mixing in $\chi^{(3)}$-type nonlinear media could be used to provide potential solutions for the first two problems.

The standard SPUC three-wave mixing (3-wave SPUC or 3-SPUC) in a $\chi^{(2)}$ nonlinear medium is governed by the interaction Hamiltonian, $H=\gamma ab^\dagger c^\dagger + \gamma^* a^\dagger bc$, where the interaction strength, $\gamma$, arises from the second-order ($\chi^{(2)}$) medium nonlinearity and is normally extremely weak. The basic idea of SPUC is to pump the third mode, c, with a bright classical laser beam, with electric field E, to induce a coherent coupling between the two remaining modes, giving an effective Hamiltonian, $H=\tilde{\gamma}ab^\dagger c^\dagger + \tilde{\gamma}^* a^\dagger bc$, where $\tilde{\gamma}=\gamma E^*$ is a new effective first-order nonlinear coupling strength which is enhanced by the bright pump intensity. Experimentally, it is then necessary to choose the nonlinear medium and mode frequencies so that the phase-matching conditions (energy conservation, $Wa=Wb+Wc$, and momentum conservation, $k_a=k_b+k_c$) are satisfied.

In this proposal, we wish to demonstrate a generalized version of this process in the context of a four-wave mixing interaction (4-wave SPUC or 4-SPUC). Indeed, since there are several types of four-wave mixing interactions, we specifically wish to consider those of the form that involve four distinct frequency modes: $H=\gamma ab^\dagger c^\dagger d^{\dagger+} \gamma^* a^\dagger bcd^\dagger$ and $H=\gamma ab^\dagger c^\dagger d^{\dagger+} \gamma^* a^\dagger bcd^\dagger$, where the interaction, $\gamma$, now arises from the third-order ($x^{(3)}$) nonlinearity, which also very weak, and indeed even weaker than the $x^{(2)}$ nonlinearity is most media. In either case, when mode d is pumped by a bright classical laser beam, E, the effective Hamiltonian reduces to $H=\tilde{\gamma}ab^\dagger c^\dagger + \tilde{\gamma}^* a^\dagger bc$, which now looks like the standard three-wave mixing Hamiltonian, except that the nonlinear coupling is based on a $x^{(3)}$ nonlinearity and its strength is now enhanced by the bright coherent pump beam.

There are many different media that can be used to provide a $x^{(3)}$ nonlinear interaction for four-wave mixing. Some examples which are very promising for strong $x^{(3)}$ interactions are: standard optical fibres, photonic crystal fibres, silicon waveguides and EIT media. However, the process that we describe below is completely general and could be implemented in any medium possessing a non-zero third-order $x^{(3)}$-type nonlinearity.

In the following section, we describe the pumped four-wave mixing process (4-SPUC) involving four distinct frequency modes (described by the Hamiltonians $H=\gamma ab^\dagger c^\dagger d^{\dagger+} \gamma^* a^\dagger bcd^\dagger$ or $H=\gamma ab^\dagger c^\dagger d^\dagger \gamma^* a^\dagger bcd^\dagger$). However, as we mention in Sec. III A, it is also possible to implement a special case of this 4-SPUC process when the two modes b and c have the same frequency (i.e. they are completely indistinguishable modes). In this case, the full Hamiltonian is either $H=\gamma ab^{\dagger 2}c^\dagger d^{\dagger+}\gamma^* a^\dagger b^2 cd^\dagger$ or $H=\gamma ab^{\dagger 2}c^\dagger d^\dagger \gamma^* a^\dagger b^2 cd^{\dagger\tau}$, and (in both cases) when mode d is pumped by a bright classical laser beam, E, the effective Hamiltonian reduces to $H=\tilde{\gamma}ab^{\dagger 2}+\tilde{\gamma}^* a^\dagger b^2$.

A: The Pumped Four-Wave Mixing Process—the Full Calculation

Consider a four-wave mixing process described by the nonlinear interaction Hamiltonion $$H_{int}=\gamma ab^\dagger c^\dagger d^{\dagger+}\gamma^* a^\dagger bcd \tag{1}$$

where the following phrase-matching conditions are satisfied:

$$\Delta w = wa-wb-wc-wd=0, \tag{2}$$

$$\Delta k = ka-kb-kc-kd=0. \tag{3}$$

Figure 1B:
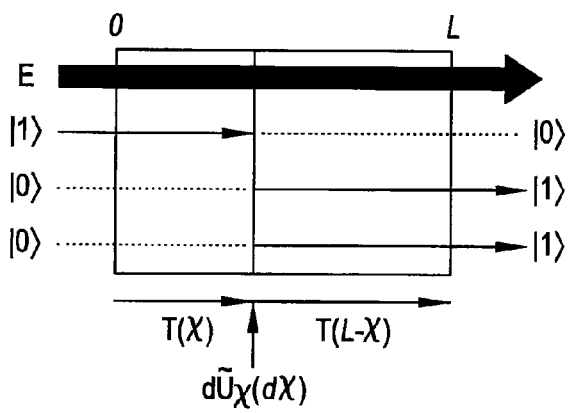
FIG. 1B depicts embodiments of different interaction histories in a four-wave mixing environment.
Figure 1C:
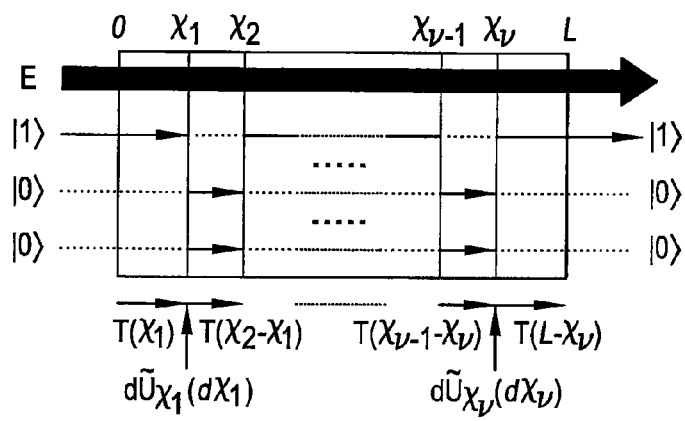
FIG. 1C depicts an embodiment of a general interaction history for 1 conversion events in a four-wave mixing environment.

FIGS. 1A-1C depict four-wave mixing in a nonlinear medium. As shown, the medium can be divided into infinitesimal slices with propagation and interaction components. This leads to different interaction histories (Feynman paths) which interfere and can be grouped according to the number of conversion events; and the general interaction history for 1 and v conversion events, respectively. The interaction positions must be integrated along the length of the medium to calculate that term's total contribution.

Pumping the fourth mode with a bright classical field, d=E, gives the following simplified interaction Hamiltonian in the semiclassical approximation:

$$H=\tilde{\gamma}ab^\dagger c^\dagger+\tilde{\gamma}^* a^\dagger bc \tag{5}$$

where $\tilde{\gamma}=\gamma E^*$. The system momentum is described by the following equation:

$$G = \sum_{j=\{a \ldots d\}} \hbar k_j a_j^\dagger a_j. \tag{6}$$

The unitary operators for time and propagation evolution are therefore:

$$U=\exp(-itH/\hbar), \tag{7}$$

$$T=\exp(-ir \cdot G/\hbar). \tag{8}$$

Consider a nonlinear medium of length, x=L, and divide it up into infinitesimal slices of thickness, dx as shown in FIG. 1A. Apart from the bright classical pump beam, assume then that the input state for the remaining three photon modes is a single photon in mode a and vacuum in the other modes, i.e. $\psi_{in}>=|1,0,0>$. Now break up the propagation of the modes through the medium according to the thin infinitesimal slices, where each slice consists of an infinitesimal nonlinear interaction, dU(dt), and an infinitesimal propagation element, dT(dx), where the interaction time, $dt=n_a\, dx/c$, is the time taken for the first mode to propagate a distance dx through the medium. In other words, the output state can be written:

$$|\psi_{out}\rangle=dT\, dU \ldots dT\, dU\, dT\, dU|\psi_{in}\rangle. \tag{9}$$

Because the four-wave mixing process is governed by a certain interaction strength, $\gamma$, it is always possible to choose an slice thickness which is small enough that, with high probability, the application of the infinitesimal interaction dU does nothing and with small probability produces a conversion event between the modes. Thus, the exponential form of the interaction unitary can be replaced with the first-order Taylor expansion:

$$dU(dx) = 1 - \frac{in_a dx}{\hbar c}[\tilde{\gamma} ab^\dagger c^\dagger + \tilde{\gamma}^* a^\dagger bc]. \quad (10)$$

Note that $\tilde{\gamma} = \tilde{\gamma}(x)$ is a complex quantity with a phase that rotates with the electric field, $E(x) = E\exp(-ik_d x)$. The infinitesimal interaction operator is therefore:

$$dU_x(dx) = 1 - \Gamma dx[e^{+ik_d x}ab^\dagger c^\dagger + e^{-ik_d x}a^\dagger bc], \quad (11)$$

Using this form, it is clear to see that successive applications of dU will give rise to many terms which will interfere in the output (at each point either nothing happens or a conversion event occurs). Each of these terms will therefore correspond to a different possible history for the fields which propagate through the medium to the point x=L. This reduces naturally to a Feynman path integral. Using this interpretation, one can simply collect "like terms" which have all experienced the same number of conversion events, i.e. v conversion events at positions $x_1, \ldots x_v$. By calculating this result for each case, the total output state is simply the sum of all such terms.

When v=0, there are no conversion events and the evolution is trivial:

$$|\psi_{in}\rangle \to T(L)|1,0,0\rangle = e^{-ik_a L}|1,0,0\rangle. \quad (12)$$

As shown in FIG. 1B, when v=1, there is a single conversion event which could have occurred at any point throughout the medium, and the result is simply the sum of these different possibilities. This can be calculated by integration:

$$|\psi_{in}\rangle \to \int_0^L T(L-x_1) d\tilde{U}_{x_1}(dx_1) T(x_1)|1,0,0\rangle, \quad (13)$$

$$= \int_0^L T(L-x_1) d\tilde{U}_{x_1}(dx_1) e^{-ik_a x_1}|1,0,0\rangle, \quad (14)$$

$$= \int_0^L dx_1 e^{-ik_a x_1} T(L-x_1) \Gamma e^{+ik_d x_1}|0,1,1\rangle, \quad (15)$$

$$= \int_0^L dx_1 e^{-ik_a x_1} e^{+ik_d x_1} e^{-i(k_b+k_c)(L-x_1)} \Gamma |0,1,1\rangle, \quad (16)$$

$$= \Gamma e^{-i(k_b+k_c)L} \int_0^L dx_1 e^{i(-k_a+k_d+k_b+k_c)x_1}|0,1,1\rangle. \quad (17)$$

However, because we have already assumed that there is perfect phase matching ($\Delta k$=0), the phase is the complex amplitude is one. Thus the integral is $\int_0^L dx_1 = L$ and the overall result is:

$$|\psi_{in}\rangle \to \Gamma L e^{-i(k_b+k_c)L}|0,1,1\rangle. \quad (18)$$

When v=2, the conversion events occur at $x_1$ and $x_2$:

$$|\psi_{in}\rangle \to \int_0^L \int_0^{x_2} T(L-x_2) d\tilde{U}_{x_2}(dx_2) T(x_2-x_1) \quad (19)$$
$$d\tilde{U}_{x_1}(dx_1) T(x_1)|1,0,0\rangle,$$

$$= \int_0^L \int_0^{x_2} dx_1 T(L-x_2) d\tilde{U}_{x_2}(dx_2) T(x_2-x_1) \quad (20)$$
$$\Gamma e^{-ik_a x_1} e^{+ik_d x_1}|0,1,1\rangle,$$

$$= \int_0^L dx_2 \int_0^{x_2} dx_1 T(L-x_2) \Gamma^2 \quad (21)$$
$$e^{-ik_a x_1} e^{+ik_d x_1} e^{-i(k_b+k_c)(x_2-x_1)} e^{-ik_d x_2}|1,0,0\rangle,$$

$$= \int_0^L dx_2 \int_0^{x_2} dx_1 \Gamma^2 e^{-ik_a x_1} e^{+ik_d x_1} e^{-i(k_b+k_c)(x_2-x_1)} \quad (22)$$
$$e^{-ik_d x_2} e^{-ik_a(L-x_2)}|1,0,0\rangle,$$

$$= \Gamma^2 e^{-ik_a L} \int_0^L dx_2 \int_0^{x_2} dx_1 e^{i\Delta k(x_2-x_1)}|1,0,0\rangle, \quad (23)$$

$$= \frac{\Gamma^2 L^2}{2} e^{-ik_a L}|1,0,0\rangle. \quad (24)$$

The key to calculation is recognizing the symmetries that arise from the fact that there is only a single photonic excitation in the system at the input. Throughout the entire length of the medium, the state can only be either $|1,0,0\rangle$ or $|0,1,1\rangle$, because in both cases, only one term from dU can contribute, and which in either case converts one state into the other. There is also symmetry in the phases which the field modes accrue throughout the medium, leaving a global phase which depends only on the total length L and a phase inside the integral which is proportional to the phase mismatch, $\exp(i\Delta k(-x_1+x_2-x_3+\ldots))$. Therefore, as shown in FIG. 1C, depending on whether v is odd or even, there are two possible forms for the final result:

$$v \text{ even}, |\psi_{in}\rangle \to \frac{\Gamma^v L^v}{v!} e^{-ik_a L}|1,0,0\rangle, \quad (25)$$

$$v \text{ odd}, |\psi_{in}\rangle \to \frac{\Gamma^v L^v}{v!} e^{-i(k_b+k_c)L}|0,1,1\rangle. \quad (26)$$

Figure 2:
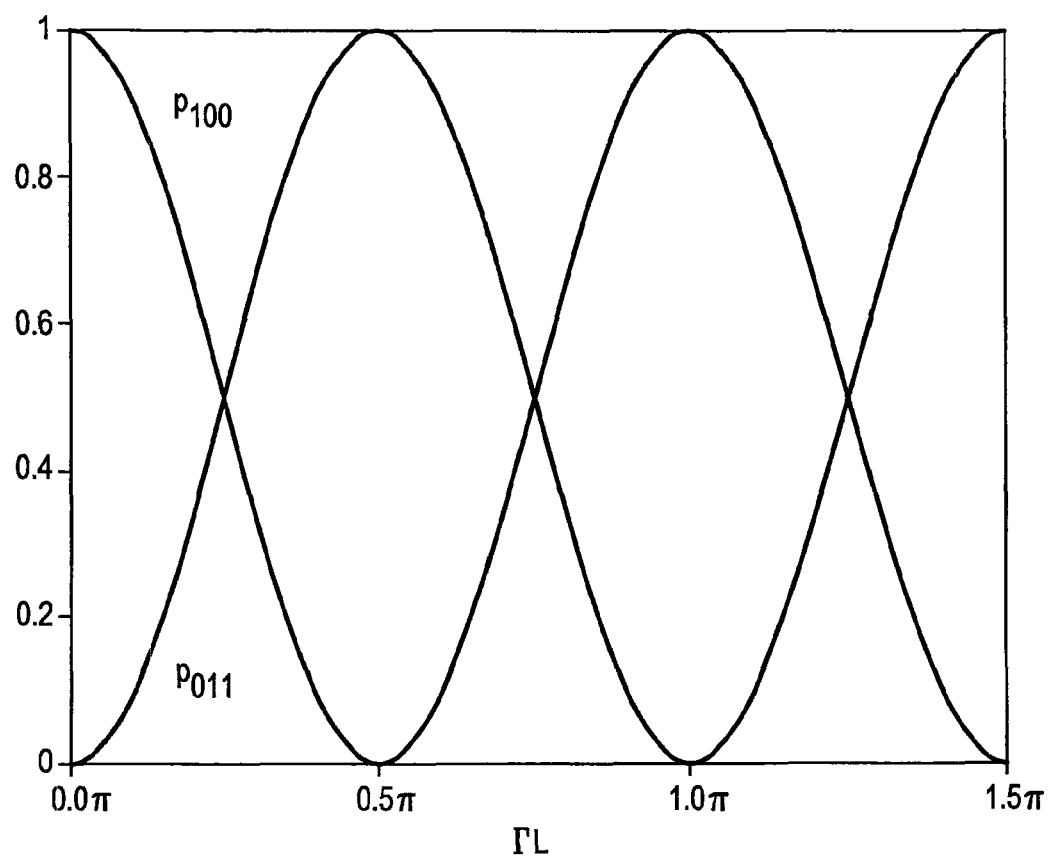
FIG. 2 depicts an embodiment of a complete output state for a four-wave mixing process.

Because these are just the coefficients in the Fourier expansions of $\cos(\Gamma L)$ and $\sin(\Gamma L)$, the complete output state, as shown in FIG. 2, is therefore:

$$|\psi_{out}\rangle = e^{-ik_a L}\cos(\Gamma L)|1,0,0\rangle + e^{-i(k_b+k_c)L}\sin(\Gamma L)|0,1,1\rangle. \quad (27)$$

Thus, by choosing the appropriate medium length, L, this one pumped four-wave mixing process can be made to perform three extremely important functions. By interacting the beams for one quarter of a full cycle (L=π/2Γ), a single photon in mode a can be converted deterministically into two single photons in modes b and c, respectively. Alternatively, if the input state is instead $|0,1,1\rangle$, the two single photons will be converted again deterministically into one single photon, a two-photon absorber. Finally, with the $|0,1,1\rangle$ input state, if the medium is twice as long, L=π/Γ, the input state will coherently move to $|0,1,1\rangle$ and back again, returning to exactly the same state, except for a π phase shift-a controlled phase shift which is only applied if there is exactly one photon present in each of the two modes b and c.

Note that this complete derivation generalizes easily for n-wave nonlinear mixing processes in (n−1)-order ($\chi^{(n-1)}$) nonlinear media. If one mode is pumped with a bright classical laser beam, then an effective (n−1)-wave mixing process is produced with an interaction strength which is enhanced by the intensity of the pump beam.

So far, the main application which we have discussed for the three building-block processes described above, is quantum computation. Quantum computers are potentially useful for, e.g., decoding encrypted information, biological and chemical simulations and simulations of other complex quantum systems, solving optimization problems, data bank searching processes, etc.

However, as we discuss in more detail below, these building blocks will also be useful in many other fields of quantum technology. For example, they will allow the production of bright multiphoton sources (including entangled sources) and high-efficiency single-photons detectors for quantum communication, quantum cryptography and quantum games, as well as quantum imaging and quantum-enhanced metrology. They will also potentially be able to enhance classical optics applications, such as enhanced optical recording using multiphoton states, optical time-domain reflectometry, classical interferometry, etc.

FIGS. 3A and 3B depict two similar schemes for implementing 100%-efficient cascaded photon doubling. The method of FIG. 3A uses four nondegenerate frequency modes (one type of 4-wave SPUC) and (two types of) 3-wave SPUC to convert and maintain the frequency of the created photons. The method of FIG. 3B uses two different types of 4-wave SPUC with two frequency-degenerate modes, alternately swapping between the two frequencies to maintain the frequencies of the created photons.

Given an input state $|0,1,1\rangle$ and an interaction length $\Gamma L=\pi/2$, we can convert one single photon into 2 single photons with 100% efficiency. This process can be used in several ways to solve three of the DiVincenzo criteria for photonic quantum computing as well as making fault-tolerant encoding realizable with 100% efficiency.

1. Scaleable Source of Triggered States of Many Single Photons

Spontaneous parametric down-conversion (SPDC) is currently the best known source of heralded single photons. By chaining efficient photon doubling processes, we can efficiently create an arbitrary number of photons from one initial photon. This can be made into a scaleable source of states with arbitrarily large photon numbers in two different ways.

According to the method of FIG. 3A—Step 1: use a single 100%-efficient 4-wave SPUC process to convert a heralded single photon from SPDC into two photons at two other frequencies. Step 2: separate the photons using frequency selectors. Step 3: use two different 100%-efficient 3-wave SPUC processes to convert the two new photons to the frequency of the original SPDC heralded photon. Step 4: Repeat Steps 1-3 as many times as required for all output photons. This chained process is in principle 100% efficient (completely deterministic), is heralded and only requires linear resources to create N-photon states (one 4-wave SPUC+two 3-wave SPUCs per extra photon).

By contrast, the method of FIG. 3B uses a special case of the 4-wave SPUC based on a semiclassical interaction Hamiltonian of the form $H=\tilde{\gamma}ab^{\dagger\dagger}+\tilde{\gamma}*a^\dagger bb$. This gives different phase-matching conditions and all four optical modes can be roughly the same frequency, e.g., in adjacent bins of the telecom wavelength band. Step 1: use the above (still 100%-efficient) 4-wave SPUC process to convert a heralded single photon from SPDC into two photons at the same frequency (i.e. in a two-photon Fock state). Step 2: embed this process into both arms of an interferometer and separate the indistinguishable photons via reverse-HOM interference at a beam splitter ($|2,0\rangle+|0,2\rangle\rightarrow|1,1\rangle$). Step 3: use two 4-wave SPUC processes with a different pump wavelength to convert each single photon into a new two-photon Fock state at the frequency of the original SPDC single photon. Step 4: separate the new two-photon Fock states using reverse-HOM interference. Step 5: repeat Steps 1-4 as many times as required for all output single photons. This process requires two different modified 4-wave SPUC processes with different pumps but requires no 100% 3-wave SPUC processes. The entire process can be carried out at telecom wavelengths. Once again, the process is 100% efficient in principle, heralded and requires only linear resources to create N-photon states (three 4-wave SPUC per extra 3 photons).

Both of these methods work with any initial source of single photons (heralded or triggered), not just single photons from SPDC. The only challenge is to find an appropriate $x^{(3)}$ material with the correct phase matching conditions.

The count rates for both of these methods is determined by the count rate of the initial single photon source. For example, very high count rates could be achieved using heralded single photons from SPDC, because achieving very high count rates for producing single-photon pairs is now standard practice in quantum optics laboratories.

This process solves the DiVincenzo Criteria 1 and 2 for photonic quantum computing. Future investigation:

Calculate the scaling if the process is implemented with less than 100%.

Calculate what happens to higher-order input states.

2. Extending the Multiphoton Source to a Source of Entangled Multiphoton States

Figure 4:
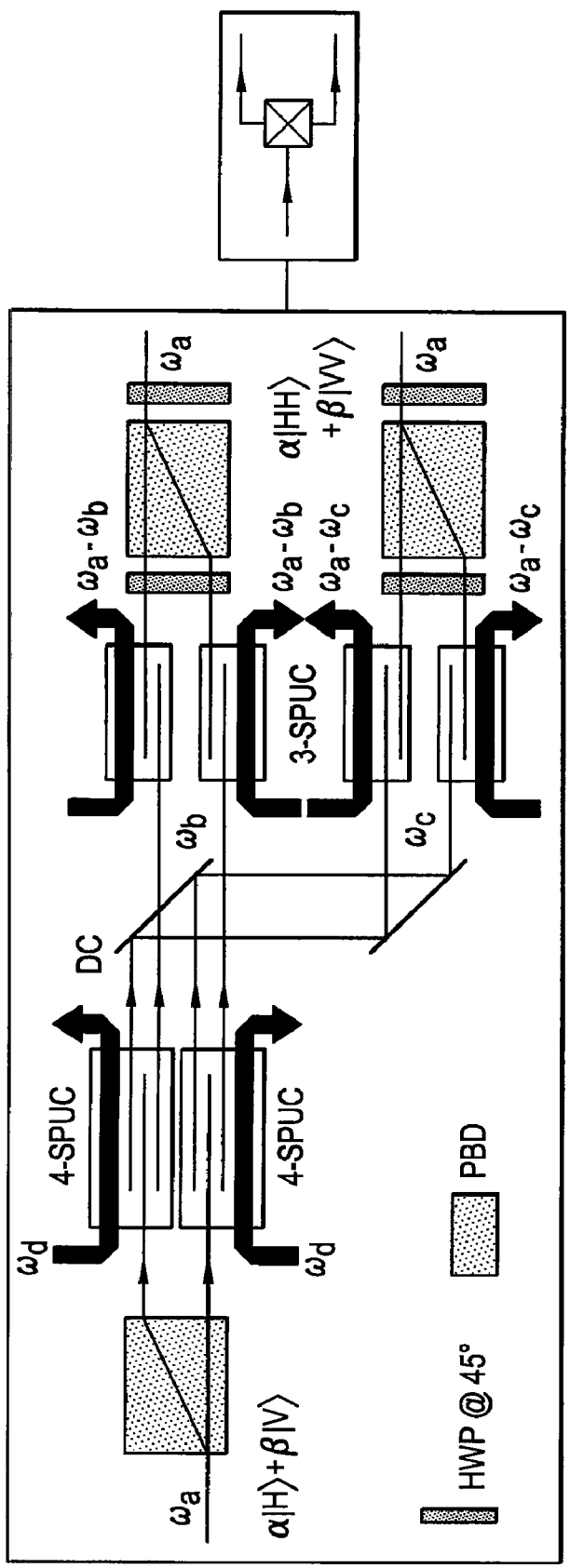
FIG. 4 depicts an embodiment of a process for creating entangled photon pairs using photon doubling.

FIG. 4 depicts an embodiment of a process for creating entangled photon pairs using photon doubling (i.e. optimal cloning). Embodiments of the process depicted use a stable polarization-sensitive interferometric setup or a "crystal sandwich" configuration to coherent photon-double both polarization components of an input photon. Embodiments of the above process may be tuned to produce maximally or nonmanximally entangled states.

As shown in FIG. 4, if the two polarization states of the input single photon are split up in a polarization-sensitive interferometer (e.g., a Mach-Zender interferometer using polarizing beam displacers, or a Sagnac source) and if a 4-wave SPUC photon doubling interaction is applied to both polarizations, then the same process can be used as a source of polarization-entangled photons. Alternatively, the same result could be achieved using a "crystal sandwich" arrangement. Existing experiments have already repeatedly demonstrated that these techniques produce extremely high-quality entanglement and also often very high count rates. Moreover, by tuning the polarization of the input single photon, we can select different entangled, including both maximally and non-maximally entangled states.

Figure 5:
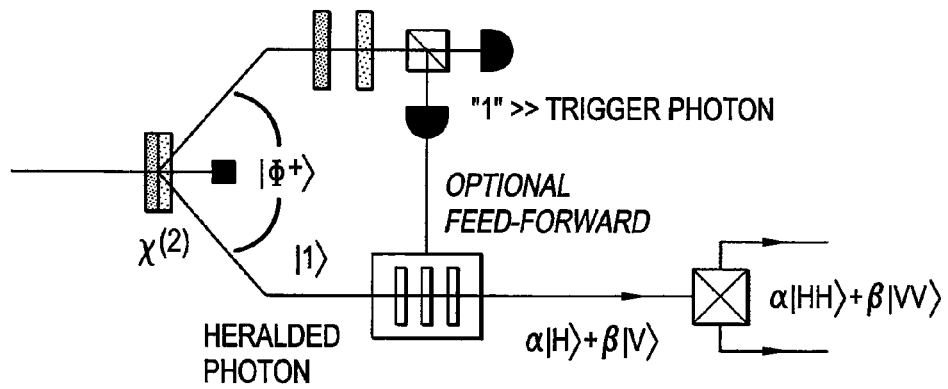
FIG. 5 depicts an embodiment of a process that uses one photon from a maximally entangled state as the input photon to the entangling photon doubler.

FIG. 5 depicts an embodiment of a process that uses one photon from a maximally entangled state as the input photon to the entangling photon doubler, allowing the input polarization state to be selected by nonlocal state preparation.

As shown in FIG. 5, if the input single photon is one of a maximally entangled Bell pair, then by projecting the polarization of the other photon, the polarization state of the input single photon can be prepared nonlocally and therefore the maximally entangled state can be prepared nonlocally by a simple choice of measurement type (remote state preparation). This choice can also be made randomly by building an appropriate network of measurement projectors using beam splitters. This may have applications in secure quantum communication or quantum dense coding, because different entangled states can be prepared nonlocally. Note that the measurement projection choice for the other half of the entangled state can be made long after an entire communication protocol has been finished. This may open up interesting experiments for exploring fundamental issues in the foundations of quantum mechanics.

Figure 6:
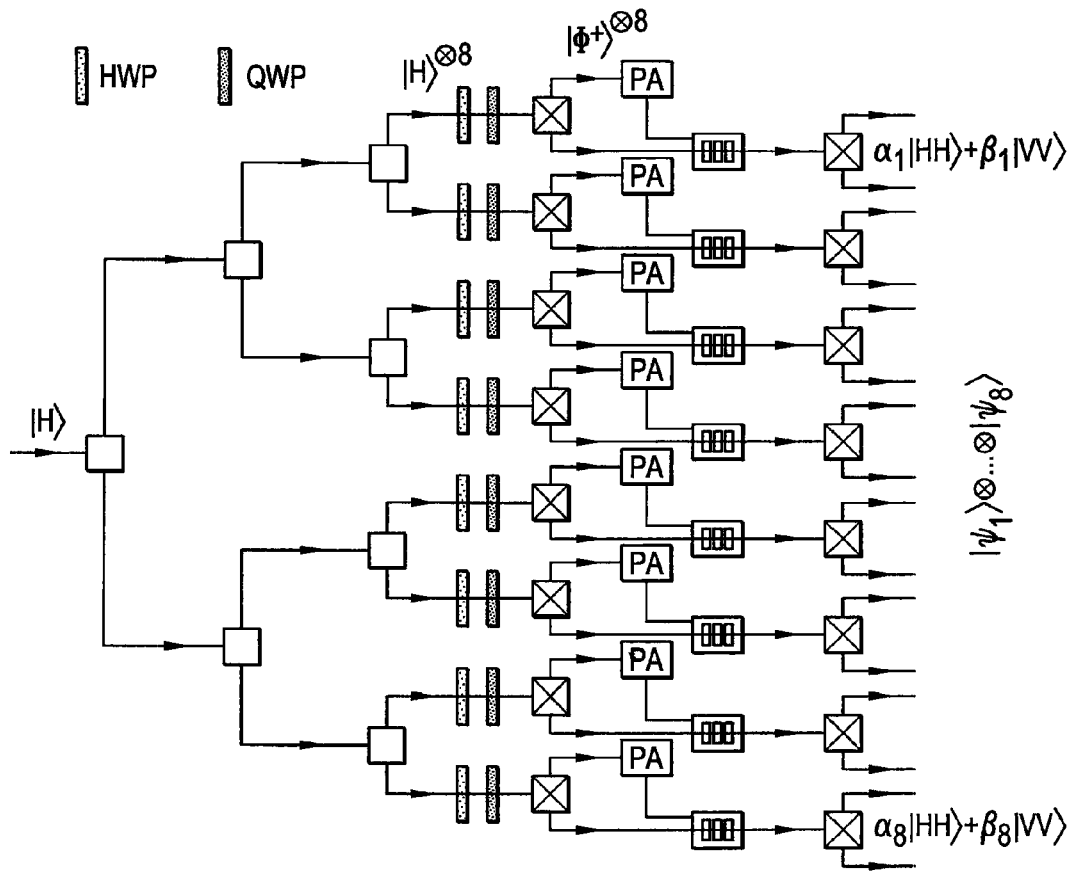
FIG. 6 depicts an embodiment of a photon generation process where the photon doubling and entangling photon doubling components can be combined to produce a high-brightness source of entangled states.

FIG. 6 depicts an embodiment of a photon generation process where the photon doubling and entangling photon doubling components can be combined to produce a high-brightness source of entangled states (potentially selected via nonlocal state preparation).

Figure 7:
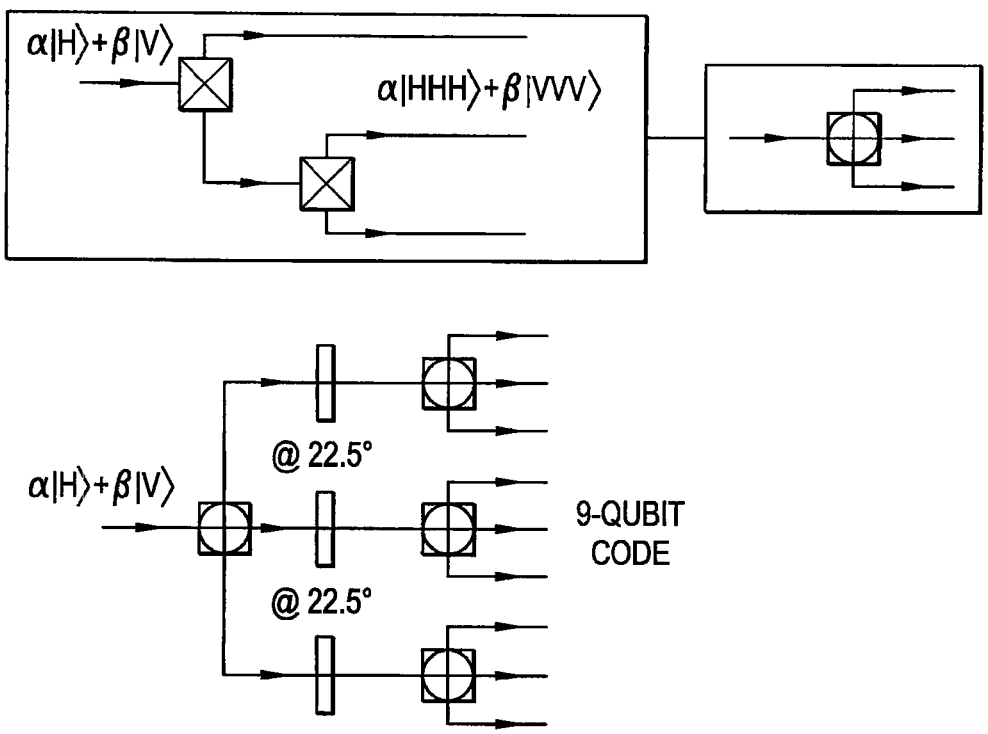
FIG. 7 depicts an embodiment of a simple circuit for the encoding step of a 9-qubit phase- and amplitude-protected error encoding for fault-tolerant quantam computation.

FIG. 7 depicts an embodiment of a simple circuit for the encoding step of a 9-qubit phase- and amplitude-protected error encoding for fault-tolerant quantam computation.

The technique depicted in FIG. 6 can be used to prepare a non-entangled N-photon state and by tuning the polarization of these photons, we can produce an arbitrary number (N) of heralded (or triggered) maximally entangled Bell pairs. If half of these photons are then used as inputs for a further polarization-sensitive photon doubling step and the other half are kept for remote state preparation, then we also have a source of N remotely tunable, heralded (or triggered) entangled states (maximally or non-maximally entangled).

If the above chaining process is extended so that every photon doubling step is done in a polarization-sensitive fashion (to produce entanglement), then this also serves as a heralded (triggered) source of arbitrarily large GHZ entanglement.

As shown in FIG. 7, this scheme can also be used to encode logical qubits with 100% efficiency from arbitrary single photons, i.e. $\alpha|0\rangle+\beta|1\rangle\rightarrow\alpha|000\rangle+\beta|111\rangle$. If used in conjunction with simple wave-plate rotations, this could sequentially encode logical states which were protected against both phase and amplitude decoherence. Produce efficient fault-tolerant quantum computing. This would provide a serious improvement to the already long photonic decoherence times (DiVincenzo Criterion No. 3).

Note that this procedure can also be used as a version of optimal quantum cloning.

With fast feed-forward, you can remotely prepare any maximally entangled state with only measurement projections.

A simple modification of the basic three-photon module illustrated in the box of FIG. 7 (i.e. inserting wave plates before and after the second entangling photon doubler) can be used to prepare a state which possesses so-called "entangled entanglement", where the two orthogonal basis states of a single photon (e.g., |H⟩ and |V⟩) are entangled with two orthogonal entangled two-photon states (e.g., (e.g., |ϕ⁺⟩~|HV⟩+|VH⟩) and |ϕ⁺⟩~|HV⟩−|VH⟩)). This state could be used as the basis for a reference-frame-independent secure quantum key distribution scheme. Here, the two communicating parties do not need to share a common reference frame because the bit of information is transmitted in the entangled correlations between two transmitted single photons, and this information can be distinguished without knowing the "correct" reference frame.

Future investigation:
Extend the fault-tolerant error encoding to include encoding against photon loss.
Explore cluster-state creation using the 4-wave SPUC components.

3. Arbitrarily High-efficiency Single Photon Counters at all Wavelengths

The processes used for scaleable sources of triggered multiphoton states can be repeated at the input for a single-photon detector.

Figure 8:
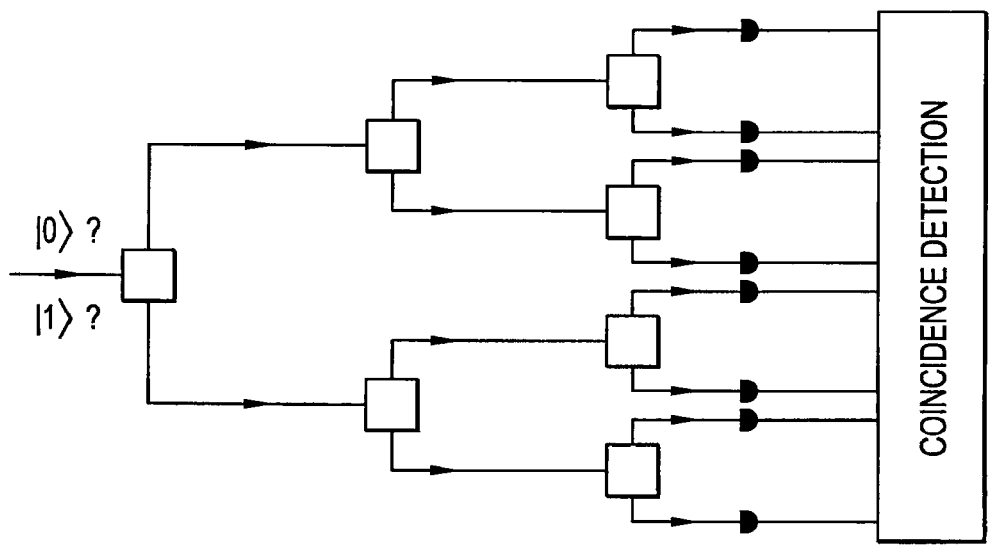
FIG. 8 depicts an embodiment of a cascaded photon-doubling circuit.

FIG. 8 depicts an embodiment of a cascaded photon-doubling circuit that can be used to increase single-photon detection efficiency arbitrarily close to 1 with standard single-photon detectors.

As shown in FIG. 8, if a single photon enters the detector, it can be converted with 100% efficiency into an N-photon state with arbitrarily many photons.

A "successful single photon detection event" can be interpreted as occurring when a small subset (M) of the single-photon detectors fire simultaneously (one or more).

If the single-photon detectors have a total detection efficiency of p (i.e. an error probability $p_e=1-p$ that single photon arrives and is not detected), then the error probability is reduced to $$p_e^- = \sum_{m=0}^{M-1-N} C_m p^{m^-}(1-p)^{N-m^-}$$

This error probability can be made arbitrarily small, irrespective of the original error probability 1−p, by choosing N large enough and ensuring that M≪N—i.e., this technique will work with all single photon detectors at all wavelengths, provided the appropriate phase-matching conditions can be fulfilled.

This procedure, in conjunction with wave plates and high-quality polarization beam splitters (e.g., polarizing beam displacers), solves the DiVincenzo Criterion No. 5.

The 4-wave SPUC process does not need to be 100% efficient to demonstrate substantial improvements in detector efficiencies, because both the converted and unconverted components can be detected. In fact, by recycling the unconverted components through more 4-wave SPUC processes, the overall net efficiency of the conversion process can also be made arbitrarily close to 100%. This doesn't scale quite as nicely.

B. Deterministic CZ (Controlled-phase) Gate

Figure 9:
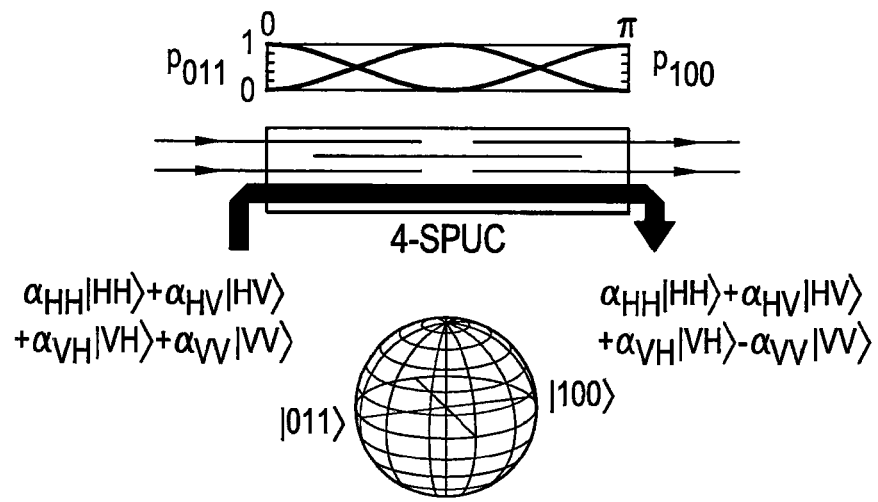
FIG. 9 depicts the use of a medium with interaction length $\Gamma L$-$\pi$ to implement an entangling CZ gate between two logical states of frequency non-degenerate photons.

FIG. 9 illustrates how using a medium with interaction length $\Gamma L=\pi$ will implement an entangling CZ gate between two logical states of frequency non-degenerate photons (can be implemented directly in a polarization or spatial information encoding). The phase shift on the 11 is the result of a Berry-type geometric phase.

Because the 4-wave SPUC process is a coherent process which cycles between two orthogonal states, it is also possible to create geometric (Berry's) phase effects, in the same way as the all-optical switch demonstrated for 3-wave SPUC in Ref. As shown in FIG. 9, given an input state |0,1,1⟩ and an interaction length $\Gamma L=\pi$, the input state will coherently rotate to |0,1,1⟩ and back again to |0,1,1⟩, but now with a π phase shift—the final state will be |0,1,1⟩. This is now a controlled πr phase shift—it is only applied if both single photons are present—and can be used to implement a maximally entangled controlled-Z (CZ) gate with 100% efficiency, either in a single-rail logical encoding (0=0 photons, 1=1 photon in field mode), or, because the nonlinear mixing processes are normally polarization sensitive (they only work for one polarization), directly in a dual-rail polarization encoding ($|0\rangle=|H\rangle$, $|1\rangle=|V\rangle$ one photon in H or V respectively). In the latter case, the phase shift is only applied if both photons are, say, vertically polarized. This is probably the easier scheme to implement, but the other single-rail encoding may be particularly promising for use in wave-guide and integrated-optics architectures.

A deterministic all-polarization CZ gate—in conjunction with straightforward single qubit polarization rotations using wave plates, this provides a universal set of quantum gates, all operating at 100% efficiency. Note that this immediately makes it possible to perform 100% efficient Bell-state analysis and quantum teleportation.

Figure 10:
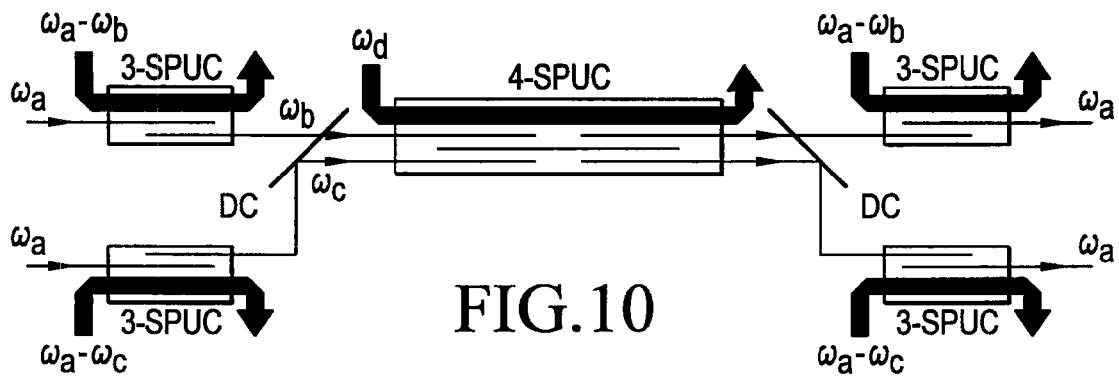
FIG. 10 an embodiment where the frequency-nondegenerate CZ gate can be converted into a 100%-efficient CZ gate.

- A CZ gate for frequency-nondegenerate photons. Current schemes which rely on non-classical interference effects (HOM interference) only work with frequency-degenerate photons. This limits the usability of such gates in certain situations where bright asymmetric sources are used.
- FIG. 10 depicts an embodiment where the frequency-nondegenerate CZ gate can be converted into a 100%-efficient CZ gate for two frequency-degenerate photons in conjunction with 100%-efficient 3-wave SPUC. As shown in FIG. 10, when combined with 100%-efficient 3-wave SPUC, this also gives a scheme to implement deterministic CZ gates between frequency-degenerate photons.
- This CZ gate can be switched very fast optically (by switching the bright classical pump beam in and out), allowing the fast, real-time "rewiring" of optical quantum circuits.
- This may have application in various adaptive quantum schemes such as quantum phase estimation or adaptive quantum algorithms.
- This process solves, with a single optical element, the DiVincenzo Criterion No. 4 for optical quantum computing.
- Note: when used in the context where the two single-photon input modes have the same frequency, this then implements, with 100% efficiency the so-called nonlinear sign shift gate which was at the heart of the original KLM proposal for optical quantum computing: i.e. mapping $\alpha|0\rangle+\beta|1\rangle+\gamma|2\rangle \rightarrow \alpha|0\rangle+\beta|1\rangle-\gamma|2\rangle$.
- N.b. using two partial 4-wave SPUC processes, separated in time, it is possible to introduce arbitrary geometric phases.

C. Deterministic Two-photon Absorber

Figure 11:
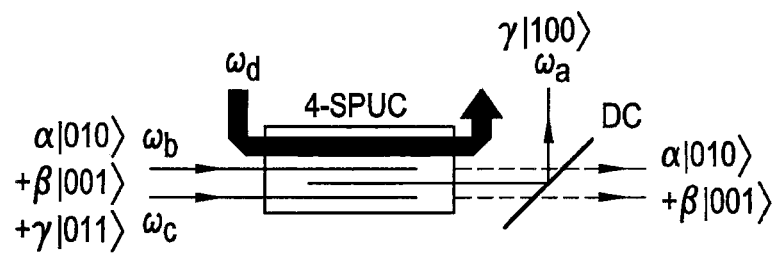
FIG. 11 depicts an embodiment of a photon merger. The drawings will be described in detail in the course of the detailed description of the invention.

FIG. 11 depicts an embodiment of a photon merger. In a photon merger, a photon doubling process may be reversed to produce a component that converts only the two-photon component into a third frequency which can then be easily filtered off.

As depicted in FIG. 11, using 4-wave SPUC based on the fully frequency-nondegenerate semiclassical interaction Hamiltionian, $H=\tilde{\gamma}ab^\dagger c^\dagger + \tilde{\gamma}^* a^\dagger bc$, and given an input state $|0,1,1\rangle$ and an interaction length $\Gamma L=\pi/2$, we can convert two single photons into one single photon (at a different frequency, potentially separated by a long way) with 100% efficiency. Using 4-wave SPUC based on the partially frequency-degenerate semiclassical interaction Hamiltionian, $H=\tilde{\gamma}ab^{\dagger+}+\tilde{\gamma}^* a^\dagger bb$, and the same interaction length, we can convert the two-photon Fock state $|0,2\rangle$ into the single photon state $|1,0\rangle$ (again at a different frequency). Using frequency filtration, this allows us to pick off (and possibly detect or throw away) the new frequency component and this constitutes a deterministic two-photon absorber for either two non-degenerate photons or a two-photon Fock state.

Two-photon absorbers are important for the implementation of the entangling $\sqrt{SWAP}$ logic gate.

- A deterministic two-photon absorber would be able to remove the main error term in the simplified twophoton CNOT architecture. In conjunction with teleportation and single-qubit rotations, as described in Ref., this would make the two-photon CNOT gate sufficient for scaleable quantum computing. Because of the polarization sensitivity of this process, it could also be implemented in the all-optical version of this gate.
- By embedding this absorber in a setup similar to the sources for entangled photon pairs described above, this process can also be used to implement arbitrary, deterministic Bell-state analysis, because the different pairs of Bell states ($\phi$ or $\psi$) can be mapped to two different wavelengths which can be separated and analyzed individually. This may be more useful than the CZ gate version in some practical situations.
- Also can be used to remove higher-order terms from down-conversion sources.
- There may be interesting experiments for picking out two-photon terms from coherent states (quantam scissors), e.g., may be able to create another single photon source.
- Use the two-photon absorber to extract two photons from a coherent state (in the form of a single photon at a different frequency). Use the photon doubler to create two photons from the single photon state and then herald the presence of the second photon by detecting the first photon.

Future investigation: With chaining, extend this to create a deterministic n-photon absorber/detector for frequency-nondegenerate photons and Fock states.

D. High-N and High-N NOON States

Beside quantum information processing and quantum communication high-N multi-photon states enable quantum enhanced measurements (quantum metrology) such as quantum imaging, quantum positioning and quantum clock synchronization. The required high brightness sources for these applications can by realized by the proposed scheme. With a special class of high-N photon number entangled photon states of the form $|N\rangle|0\rangle+|0\rangle|N\rangle$ (the so-called NOON states) it is possible to increase the resolution in interferometric experiments by a factor of N. This is of practical interest for high-resolution optical read-out and recording systems, interferometric positioning and time measurements. NOON states have been realized for N=3 and N=4. However, the brightness and scalability of these schemes is not sufficient for real applications. If the proposed scheme of cascadably doubling the photon number would be applied to both modes of a single photon state of the form $|1\rangle|0\rangle+|0\rangle|1\rangle$, this would represent a scalable, high brightness source for high-N NOON-states.

E. Low Efficiency Applications

In the above section, we have described in detail many applications for the pumped $\chi^{(3)}$ four-wave mixing process which can operate deterministically (i.e. with 100% efficiency). However, even before such deterministic operation can be achieved, these building-block processes will already provide significant advantages for many of the applications mentioned above.

For example, consider in particular using the photon doubler to make multiphoton states. Current multiphoton sources rely solely on low-efficiency spontaneous parametric down-conversion processes which exhibit extremely low count rates and large contributions from unwanted higher-order noise terms. Yet these sources have been used to demonstrate many of the state-of-the-art quantum computation tasks and can also be used in multiparty quantum communication and cryptographic schemes. The photon doubler described above could be used to create high brightness multiphoton states with much lower higher-order noise terms than the current state of the art.

In particular, a simple calculation shows the following. Using a CW-pumped (continuous wave) spontaneous parametric down-conversion (SPDC) pair source to create a triggered single photon, this photon can then be doubled in two stages (using three applications of the photon doubling process) to produce a probabilistic four-photon source. For a given signal-to-noise ratio (say, 10%) and a photon-doubling efficiency greater than 1% (very low), this would already produce four-photon states at rates equal to or higher than the best current four-photon rates from the double-pair emission terms of a pulsed SPDC source. Such a source would already have important implications for the existing quantum communication and cryptography communities.

Another example would be in the case of the two-photon absorber. Secure quantum key distribution (QKD) schemes based on information sent over a quantum channel using weak coherent states are already commercially available ways to distribute secure cryptographic keys. The main factor limiting the security of these schemes, and thus the bit-rate achievable for distributing a secure key after privacy amplification, is the vulnerability to "beam-splitter" attacks which exploit the existence of the higher-order two-photon terms which exist in the weak coherent pulse. Our twophoton absorber described above could be used to reduce the amplitude of these two-photon terms before transmitting the signal photons over the quantum channel, without affecting the amplitude of the single-photon component. Any reduction in these two-photon terms, even if it were not 100% as would be theoretically possible with our two-photon absorber, would result in a direct pay-off in terms of a higher achievable bit-rate for the secure key. This would have immediate implications for the quantum communication and cryptography communities where the number of bits is the defining, valuable resource. We have shown that a $\chi^{(2)}$ nonlinear (three-wave mixing) process works with 100% efficiency when the input is a single quantum excitation (i.e. for a $\chi^{(2)}$ process where $w_1=w_2+w_3$, it is 100% efficient when the input is either $|100\rangle$ or $|011\rangle$, where 0 or 1 indicates a single photon in mode 1, mode 2 or mode 3).

This allows us to create three important components which are special cases of the above process: a) an efficient photon doubler (1 in, 2 out); b) an efficient photon merger (2 in, 1 out); and c) an efficient two-photon entangling controlled-phase (CZ) gate (2 in, 2 out—but the output photons exhibit a 7r phase shift). These allow us to directly fulfill the four remaining (out of five) DiVincenzo Criteria for photonic quantum computing. The fifth is already solved by the intrinsic properties of photonically encoded information.

We have shown that when a $\chi^{(3)}$ nonlinear (four-wave mixing) process is pumped in one of the four modes by a bright classical (coherent) laser beam, then this produces an effective $\chi^{(2)}$ nonlinear process between the remaining three modes, where the interaction strength is enhanced proportional to the intensity of the pump beam.

Combining these two results allows us to engineer a 100%-efficient effective $\chi^{(2)}$-type three-wave mixing process where the interaction strength can be tuned by changing the intensity of the pump beam—this in principle allows arbitrarily strong interactions for a given $\chi^{(3)}$ nonlinearity (in a standard $\chi^{(2)}$ three-wave mixing process, the interaction strength is determined only by the intrinsic material properties). This explicitly includes the three special-case components described in 2) above.

Using a particular $\chi^{(3)}$-based process (with $H=\gamma ab^\dagger c^\dagger d + \gamma^* a^\dagger bcd^\dagger$) allows an effective $\chi^{(2)}$-type three-wave mixing process where all photons are close to the same frequency. In a standard $\chi^{(2)}$ three-wave mixing process, one frequency must be much larger than the other two (indeed $w_1=w_2+w_3$).

F. Material Advantages Over Conventional Technologies and the State of the Art

In typical $\chi^{(2)}$-based down-conversion (photon pair production) which is pumped by a coherent laser beam, the output state contains higher-order error terms which make an increasingly large contribution as the pair production efficiency is increased. In our scheme, by engineering the appropriate input state for a standard $\chi^{(2)}$-type three-wave mixing interaction, we eliminate the higher-order error terms and can therefore increase the photon-doubling efficiency to 100%.

In our effective $\chi^{(2)}$-type three-wave mixing interaction, which is achieved by pumping a $\chi^{(3)}$-type four-wave mixing interaction with a bright coherent beam, the effective interaction strength is enhance and controlled by the intensity of the pump beam. Thus the interaction is no longer solely dependent on the intrinsic material properties of the nonlinear medium, but can be made arbitrarily strong by increasing the pump laser intensity such that, for any given nonlinear interaction strength and interaction length, it is in principle possible to tune the efficiency to 100%.

Using a specifically $\chi^{(3)}$-based process allows an effective $\chi^{(2)}$-type three-wave mixing process where all photons are close to the same frequency—in a standard $\chi^{(2)}$ three-wave mixing process, one frequency must be much larger than the other two (indeed $w_1=w_2+w_3$). This has the advantage that components only need to work in one wavelength band, e.g., specifically the telecom band.

There have been no successful demonstrations of scaleable quantum computers to date in any proposed architecture. The precision of current state-of-the-art implementations is limited to such a degree as to make them still unusable for building a real quantum computer. These limitations can be categorized using the DiVincenzo Criteria and no current implementation of quantum computing fulfils all of these criteria (see US Road Map). In particular, optical implementations, which are among the most advanced and promising candidates for building a quantum computer still have major problems with 4 of the 5 DiVincenzo Criteria. We can use the $\chi^{(3)}$-based effective three-wave mixing process described above to implement two different optical components which together solve these remaining four criteria. The other criterion is already solved by the intrinsic properties of photonically encoded information.

(a) Deterministic Photon Doubler for Single-Photon Sources: Using our $\chi^{(3)}$-based scheme, we can convert one single photon into two single photons with 100% efficiency. By cascading this process, we can convert any current or future single photon source into an equally bright source of many photons, greatly reducing the technical demands on good single-photons—indeed, this would make down-conversion, currently the best source of heralded single photons, a scaleable solution for implementing quantum computation. This solves DiVincenzo Criteria 1 & 2.

(b) Deterministic Photon Doubler for Single-Photon Detection: When combined with any standard single photon detectors, the cascaded photon doubling process allows us to create a single photon detector with arbitrarily high detection efficiency. It operates by implementing an initial all-optical signal amplification phase before the detection process—standard single-photon detection amplifies the signal only after the detection process, which places strong restrictions on the devices ability to distinguish single-photon arrivals from thermal noise events. This solves DiVincenzo Criterion 5.

(c) Deterministic Controlled-Phase (CZ) Gate for Photons: Using the same process with different parameters, we can implement a controlled phase gate between two photons. This works for different photonic qubit encodings and even between photons with different frequencies or the same frequency (most schemes for photonic entangling gates rely on non-classical interference effects and therefore only work between photons of the same frequency). This makes the process very flexible for photonic implementations of quantum computing. In addition, the CZ gate can be switched on and off very rapidly via the bright pump beam, allowing fast, real-time "rewiring" of optical quantum circuits—this may also find applications in adaptive quantum schemes, such as quantum phase estimation or adaptive quantum algorithms.

The same process also allows us to convert two single photons into one single photon with 100% efficiency. This can be used to create deterministic two-photon absorption which also has important potential applications for quantum computing, quantum imaging and quantum-enhanced measurements, which may also have applications in biological fields. It can also be cascaded to produce complex multiphoton absorbers.

Four-wave mixing interactions are a key technology of the multibillion dollar telecommunications industry—the development of our end-products will benefit automatically from the rapid and accelerating, industry-driven technological developments in standard telecommunications.

The above scheme for high-efficiency single-photon detection also works at telecom wavelengths, where current state-of-the-art detectors have severe limitations on detection efficiency and quality (e.g., unavoidable background dark counts). Solving the single-photon detection problem in the telecom band will significantly increase the performance of fibre-based quantum cryptographic and communication products.

Because this scheme provides an inherent solution to the single-photon detection problem at telecom wavelengths (and because all photons can be near-degenerate in frequency), it provides the possibility for a quantum computation scheme operating entirely at telecom wavelengths with all plug-and-play components, e.g., potentially taking advantage of technology for frequency multiplexing of photons. No current photonic quantum computing experiments have been performed with telecom wavelengths.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A method of generating multi-photon states with up to 100% efficiency in a quantum computing or quantum communication environment with a four-wave mixing process, the method comprising:
    identifying four photon propagation modes inside a non-linear $\chi^3$ material of a predetermined length;
    providing a target photon in the first propagation mode within the material;
    pumping the material with an optical beam source in the fourth propagation mode;
    generating two new single photons from the target photon, the first converted photon having the second propagation mode and the second converted photon having the third propagation mode, where said generating is up to 100% efficient.

2. The method of claim 1, further comprising providing each of the two new single photons as target photons in the first propagation mode for subsequent iterations of said generating photons.

3. The method of claim 1, where said generating is a fully deterministic operation with 100% efficiency.

4. The method of claim 1, where the second and third propagation modes are the same.

5. The method of claim 1, where the efficiency of said generating is in a range between 10% and 100%.

6. A method of combining photons with up to 100% efficiency in a quantum computing or quantum communication environment with a four-wave mixing process, the method comprising:
    identifying four photon propagation modes inside a non-linear $\chi^3$ material of a predetermined length;
    providing two target photons within the material, the first target photon having the first propagation mode and the second target photon having the second propagation mode;
    pumping the material with an optical beam source in the fourth propagation mode;
    combining the target photons into a new single photon having the third propagation mode, where said combining is up to 100% efficient.

7. The method of claim 6, where said combining is a fully deterministic operation with 100% efficiency.

8. The method of claim 6, where the first and second propagation modes are the same.

9. The method of claim 6, where the efficiency of said combining is in a range between 10% and 100%.

10. A method of controlled photon manipulation in a quantum computing or quantum communication environment with a four-wave mixing process, the method comprising:
    identifying four photon propagation modes inside a non-linear $\chi^3$ material of a predetermined length;
    providing two target photons within the material, the first target photon having the first propagation mode and the second target photon having the second propagation mode;
    pumping the material with an optical beam source in the fourth propagation mode;
    applying a controlled $\pi$ phase shift to the target photons.

11. The method of claim 10, where the first and second propagation modes are the same.

12. A system for converting any single photon source into a source of photon pairs or a source of n photons, where n is any positive integer greater than 1, the system comprising:
    a non-linear $\chi^3$ material of a predetermined length;
    an optical beam pump source;
    an optical single-photon source that provides a target photon; and
    a photon detection and propagation mode control system,
    where the target photon is in a first propagation mode in the material, the optical beam source pumps the material in a fourth propagation mode, and the system governs the interaction of the pump source and the photon such that the target photon is converted into two heralded photons, the first heralded photon having a second propagation mode and the second heralded photon having a third propagation mode, where the conversion process is up to 100% efficient.

13. The system of claim 12, where said optical single-photon source is a spontaneous parametric down-conversion source.

14. The system of claim 12, where said optical single-photon source is at least one quantum dot.

15. The system of claim 12, where the control system is configured to perform a fully deterministic, 100% efficient conversion process.

16. The system of claim 12, where the system is configured such that the efficiency of said conversion process is in a range between 10% and 100%.

17. The system of claim 12, where the second and third propagation modes are the same.

* * * * *